US008995577B2

(12) United States Patent
Ullrich et al.

(10) Patent No.: US 8,995,577 B2
(45) Date of Patent: Mar. 31, 2015

(54) APPARATUS AND METHOD FOR MEASUREMENT OF THE RECEPTION TIME OF A PULSE

(75) Inventors: Andreas Ullrich, Gablitz (AT); Martin Pfennigbauer, Tulln (AT); Walter Schubert, Waidhofen (AT); Wolfgang Zierlinger, Rohrendorf (AT); Andreas Hofbauer, Zwettl (AT); Gerhard Ederer, Windigsteig (AT)

(73) Assignee: Riegl Laser Measurement Systems GmbH, Horn (AT)

( * ) Notice: Subject to any disclaimer, the term of this patent is extended or adjusted under 35 U.S.C. 154(b) by 1197 days.

(21) Appl. No.: 12/989,009

(22) PCT Filed: Apr. 14, 2009

(86) PCT No.: PCT/AT2009/000146
§ 371 (c)(1),
(2), (4) Date: Oct. 21, 2010

(87) PCT Pub. No.: WO2009/129552
PCT Pub. Date: Oct. 29, 2009

(65) Prior Publication Data
US 2011/0038442 A1    Feb. 17, 2011

(30) Foreign Application Priority Data
Apr. 22, 2008  (AT) ................ A 637/2008

(51) Int. Cl.
*H04L 27/06* (2006.01)
*G01S 7/497* (2006.01)
*G01S 7/40* (2006.01)
*G01S 7/52* (2006.01)

(52) U.S. Cl.
CPC . *G01S 7/497* (2013.01); *G01S 7/40* (2013.01); *G01S 7/4052* (2013.01); *G01S 7/52004* (2013.01); *G01S 2007/4082* (2013.01)
USPC .......................................... 375/340

(58) Field of Classification Search
CPC .......... G01S 7/497; G01S 7/40; G01S 7/4052
USPC .......................................... 375/215, 340, 372
See application file for complete search history.

(56) References Cited

U.S. PATENT DOCUMENTS 5,363,103 A * 11/1994 Inkol ............................. 342/13
6,829,042 B1 * 12/2004 Honda et al. ................. 356/5.01
(Continued)

FOREIGN PATENT DOCUMENTS

DE      19611233 A1    9/1997
DE   102005033403 A1   1/2007
(Continued)

OTHER PUBLICATIONS

International Search Report from Intn't. Appl'n. No. PCT/AT2009/000146 dated Jul. 30, 2009.
(Continued)

*Primary Examiner* — Syed Haider
(74) *Attorney, Agent, or Firm* — Hoffmann & Baron, LLP

(57) ABSTRACT

Apparatus for measurement of the reception time of a pulse in a receiving system, which contains at least one receiving channel with a non-linear transmission response, which receiving channel produces at its output a received signal, having a memory, in which the received signals of reference pulses with a predetermined different amplitude are available as reference signals with respect to a time scale, and having an evaluation device, which is connected to the receiving system and to the memory and compares a received signal with each reference signal with a variant time offset in order to determine that reference signal and that time offset for which the comparison discrepancy is a minimum, and outputs this time offset as the reception time with respect to the time scale.

52 Claims, 8 Drawing Sheets

(56) References Cited

U.S. PATENT DOCUMENTS

| | | | | |
|---|---|---|---|---|
| 2002/0034123 | A1* | 3/2002 | Fuenfgeld | 367/99 |
| 2006/0236157 | A1* | 10/2006 | Huang et al. | 714/700 |
| 2008/0186470 | A1* | 8/2008 | Hipp | 356/5.08 |
| 2009/0030551 | A1* | 1/2009 | Hein et al. | 700/253 |

FOREIGN PATENT DOCUMENTS

| | | |
|---|---|---|
| EP | 1 043 602 A1 | 10/2000 |
| EP | 1 329 739 A2 | 7/2003 |
| EP | 1 912 078 A1 | 4/2008 |

OTHER PUBLICATIONS

International Preliminary Report on Patentability issued Nov. 9, 2010 from related International Application No. PCT/AT2009/000146.

* cited by examiner

APPARATUS AND METHOD FOR MEASUREMENT OF THE RECEPTION TIME OF A PULSE

CROSS-REFERENCE TO RELATED APPLICATIONS

This application is a National Phase application of International Application No. PCT/AT2009/000146 filed Apr. 14, 2009 which claims priority to Austrian Patent Application No. A 637/2008, filed Apr. 22, 2008.

BACKGROUND

The present invention relates to an apparatus for measurement of the reception time of a pulse in a receiving system comprising at least one receiving channel with a nonlinear transmission response, which receiving channel supplies a received signal at its output.

The invention further relates to an apparatus for measurement of the reception time of a pulse with high dynamic range in a receiving system comprising at least two parallel receiving channels of differing sensitivity, which receiving channels produce at their outputs a set of time-parallel received signals.

Furthermore, the invention also relates to methods for measurement of the reception time of a pulse in systems of this kind.

The precise measurement of the reception time of a pulse is of enormous practical significance in surveying applications, for example for range finding through measurement of the transit time of an optical pulse. Even a time measurement error of 1 ns equates here to a distance measurement error of 30 cm, which is unacceptable for high-precision requirements. Further precision applications are found in, for example, satellite navigation, in which the reception time of satellite radio pulses has to be determined on a global time scale with a high degree of precision.

Owing to the bandwidth limitation of conventional transmitting and receiving systems, and to varying characteristics of the intermediate transmission paths, pulses received in an actual receiving system are—even if they were originally produced as ideal square-wave pulses—always subject to a certain distortion of their pulse form, hampering the establishment of a precise reception time. For range resolution in the millimetre range, for example, a time resolution in the picosecond range is required, which is not achievable with pulses distorted in this manner with a conventional threshold detection of the leading or trailing pulse edges. Refined methods have therefore already been proposed, such as using the focal point of a received pulse as the reception time, comparison of the pulse with a Gaussian pulse form ("Gauss fit") or similar, which methods do indeed provide a higher time resolution, but one which can be very much improved upon.

The use of known methods for the measurement of distances by measurement of pulse transit time is rendered yet more difficult in that, depending on the distance and reflectivity ("black", "white" or even "highly reflective") of the target, the pulses reflected on a target ("echo pulses") can—irrespective of whether optical, radio or acoustic pulses are involved—adopt an extremely large amplitude dynamic range, for example above 60 dB in the optical power and above 120 dB in the electrical output signal of a photodiode. Receiving systems that can process a dynamic range of such large proportions generally comprise compressed, i.e. strongly nonlinear, components in the receiving channel, and/or a plurality of parallel receiving channels with varying input sensitivities have to be provided in order to apportion the received signal to individual dynamic ranges that are easier to process further. Both methods lead to further distortion of the pulse form in the receiving system, making the precise establishment of the reception time yet more difficult.

SUMMARY

The object of the invention is to overcome the said disadvantages of the prior art and to create apparatuses and methods for the measurement of the reception time of a pulse that are of improved accuracy, in particular for pulses with a high dynamic range.

This object is achieved in a first aspect of the invention by means of an apparatus for the measurement of the reception time of a pulse in a receiving system comprising at least one receiving channel with a nonlinear transmission response, which receiving channel supplies a received signal at its output, this apparatus being characterised by a memory in which the received signals of reference pulses with a predetermined differing amplitude are present as reference signals with respect to a time scale, and by an evaluation device, which is connected to the receiving system and to the memory and compares a received signal with each reference signal using a varying time offset in order to determine that reference signal and that time offset for which the comparison deviation is a minimum, and outputs this time offset as the reception time with respect to the time scale.

For the first time, the invention takes into account the behaviour of actual receiving systems in the case of received pulses of varying amplitude by utilising the inherent variable pulse distortion for determination of the reception time. Owing to the "fitting" of the received signal into an amplitude group of reference signals representative of the dynamic response of the receiving system, the so-called "signature surface" of the receiving system, it is possible for the first time to achieve a significantly more precise determination of the time slot of the received signal and establishment of the reception time of the pulse than is possible with any other method known hitherto. The signature surface is characteristic of each individual receiving system, as a result of which series spread errors may also be avoided.

One especially advantageous embodiment of the invention is an apparatus for measurement of the reception time of a pulse with high dynamic range in a receiving system comprising at least two parallel receiving channels of differing sensitivity, which receiving channels supply at their outputs a set of time-parallel received signals, this apparatus being characterised by a memory in which the sets of received signals of reference pulses with predetermined differing amplitudes are present as reference sets with respect to a time scale, and by an evaluation device, which is connected to the receiving system and to the memory and compares a set of received signals with each reference set using a varying time offset in order to determine that reference set and that time offset for which the comparison deviation is a minimum, and outputs this time offset as the reception time with respect to the time scale.

This embodiment extends the concept of the invention to receiving systems with a plurality of channels with varying dynamic ranges. The invention is based on recognition of the fact that, in receiving channels which are split according to dynamic range, one and the same received pulse leads to time-parallel but differently distorted pulse forms, which can each be fitted, in the manner specified above, into system- and channel-specific signature surfaces. The combined evaluation of all channels using a common deviation criterion gives rise overall to a further significant improvement in the accuracy and therefore the precision of the reception time determination.

The apparatuses according to the invention are particularly suitable for receiving systems in which the receiving channel or channels are analogue in nature and the memory and evaluation device are digital, an analogue/digital converter being present at the output of each receiving channel. The dynamic matching thereby takes place in an analogue manner which is not time-critical, while the properties of the analogue part can be evaluated in the digital part.

According to one especially advantageous variant of the invention, it is provided that the reference signals or reference sets are present in the memory in a high first time resolution, that the received signal(s) of a pulse are sampled with a low second time resolution, and that the evaluation device varies the time offset in the resolution steps of the high first time resolution.

As a result, with a low sampling rate suitable for real-time operation of for example 500 Msamples/s (corresponding to a low time resolution of 2 ns), a significantly higher time resolution can be achieved when determining the reception time. The determination is essentially restricted only by the memory space, computing capacity and the signal-to-noise ratio available for processing of the reference signals and sets, and may perfectly well be one thousand-fold or more, for example 500 Gsamples/s corresponding to a high time resolution of 2 ps.

Accordingly, the said first (high) time resolution is preferably in the order of picoseconds (ps) and the said second (low) time resolution in the order of nanoseconds (ns).

The said time scale is preferably universal time, as a result of which the apparatuses of the invention may be used for the absolute measurement of the reception time of a pulse, for example in satellite navigation receivers.

Alternatively, the apparatuses of the invention may be used for the measurement of the transit time of a pulse from a transmitting system to a receiving system in that the time scale is preferably referenced to the emission time of the pulse from the transmitting system in order to obtain the transit time from the determined reception time.

One further advantage of the invention is that it can also supply, as a by-product, a measured value relating to the amplitude of a pulse. To this end, provision is advantageously made for the memory to additionally contain, for each reference signal or reference set, the amplitude of the associated reference pulse, and for the evaluation device to output the amplitude of that reference pulse which is associated with the determined reference signal or reference set as the amplitude of the pulse. The invention thereby enables the reception time and the amplitude of a pulse to be determined simultaneously using the same means.

For a measured reception time, the evaluation device preferably also outputs the associated comparison deviation, so that the apparatus simultaneously also supplies an indication of the quality of its measured values.

In further preferred embodiments, the apparatuses according to the invention may each contain at least one sensor, which measures and supplies at its output, as a form of further received signal, an operating state of one or more receiving channels, the memory containing such further received signals of the reference pulses as further reference signals, and, during the said comparison, the evaluation device also comparing a further received signal of this kind with the further reference signals and including it in determining the comparison deviation.

In this manner, in addition to the received signals, criteria regarding the receiving channels are also obtained as "further received signals" and used as additional comparison criteria when fitting the received signals into the signature surfaces, which further improves the accuracy of determination of the reception time.

One other advantageous embodiment of the invention is characterised in that the apparatus comprises at least one sensor, which measures the operating temperature of one or more receiving channels, that the memory contains reference signals or reference sets for various operating temperatures, and that the evaluation device determines therefrom, if necessary by means of interpolation or extrapolation, and uses in the said comparison, the reference signals or reference sets valid for the respective current operating temperature. Thermal compensation and a further increase in measurement accuracy are thereby achieved.

The fitting of the received signal into a reference signal group or signature surface ("minimum value comparison") may take place using any matching or correlation method known in the prior art. Determination of the minimum comparison deviation is preferably carried out using a least squares method, which supplies a stable criterion.

In this case, the memory may preferably also contain, in particular, weighting values for the reference signals or reference sets, which weighting values are incorporated into the least squares method in order that fine adjustments may be made.

In a second aspect, the invention achieves its objectives with a method for measuring the reception time of a pulse in a receiving system comprising at least one receiving channel with nonlinear transmission response, which receiving channel supplies a received signal at its output, the method being characterised by the following stages: providing the received signals of reference pulses of predetermined varying amplitude as reference signals relative to a time scale, comparing a received signal with each reference signal using varying time offsets in order to determine that reference signal and that time offset at which the comparison deviation is a minimum, and outputting this time offset as the reception time with respect to the time scale.

One especially advantageous variant of the invention is a method for measurement of the reception time of a pulse of high dynamic range in a receiving system comprising at least two parallel receiving channels of differing sensitivity, which receiving channels supply at their outputs a set of time-parallel received signals, the method being characterised by the following stages: providing sets of received signals of reference pulses of predetermined varying amplitude as reference sets relative to a time scale, comparing of a set of received signals with each reference set using varying time offsets in order to determine that reference set and that time offset at which the comparison deviation is a minimum, and outputting this time offset as the reception time with respect to the time scale.

As regards the advantages of the methods according to the invention, reference is made to the above explanations of the apparatuses.

It is particularly advantageous if the reference signals or reference sets are provided in a high first time resolution, the received signal(s) are sampled with a low second time resolution and during comparison, the time offset is varied in the resolution steps of the high first time resolution.

Generation of the reference signals may preferably be achieved by using a plurality of reference pulses of the same kind, which are time-offset in the resolution steps of a high time resolution, their received signals being sampled with a low time resolution and combined in a meshed manner to form the reference signal.

The said time offsetting of the reference pulses in the stages of the high time resolution may be achieved in a simple manner by, for example, appropriately phase-shifted triggering of the emission of the reference pulses or by modification of the length of their transmission path, for example by adjustment of a reflective target.

An even higher degree of measurement accuracy is achieved if, according to a further preferred feature of the invention, the combined reference signal is brought to an even higher time resolution by insertion of interpolation values.

BRIEF DESCRIPTION OF THE DRAWINGS

Further features and advantages of the invention are apparent from the following description of the preferred embodiments, which refers to the accompanying drawings in which.

DETAILED DESCRIPTION

Figure 1:
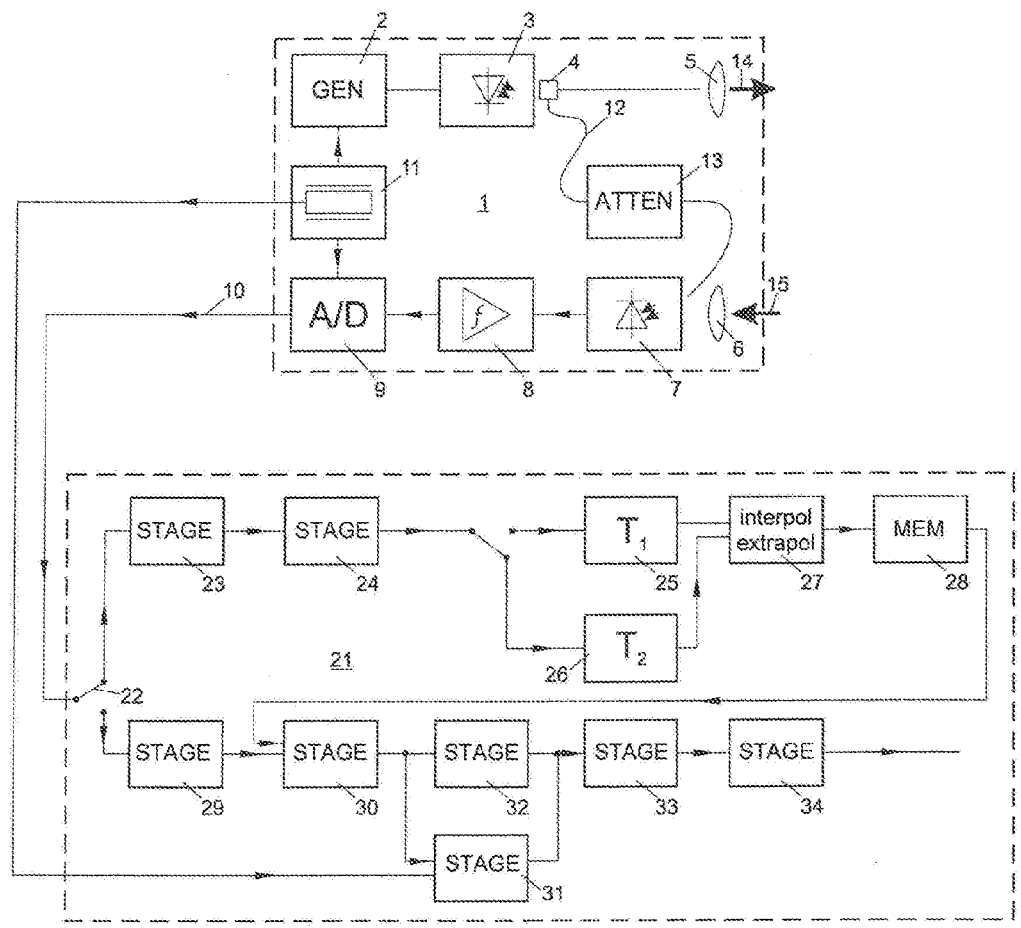
FIG. 1 shows a block diagram of a first embodiment of the apparatus according to the invention with a receiving channel.

Designated with 1 in FIG. 1 is a laser range finder, which includes a pulse generator 2. The pulse generator 2 activates a laser source 3, which emits an optical pulse when activated with an electrical trigger pulse. The laser beam is concentrated by a lens 5, emitted into the measurement field (arrow 14) and scattered, generally diffusely, at a target located in the measurement field. Some of the scattered beam is reflected back to the range finder 1 (arrow 15) and is focused by an objective lens 6 onto a photodiode 7. To achieve a high degree of sensitivity of the range finder, an avalanche photodiode (APD) is preferably used. The optical pulse striking the photodiode 7 is converted into an electrical pulse. Connected in series downstream of the photodiode 7 is an amplifier (with filter) 8.

Since the received optical pulses may differ by several orders of magnitude depending on the distance of the target and its reflectivity, the amplifier 8 generally exhibits a non-linear characteristic by means of which the dynamic range of the electrical pulses is restricted. These pulses are digitised in an analogue/digital converter 9. The sampling values corresponding to a pulse are output via a digital interface 10 and evaluated in an evaluation device 21. The analogue/digital converter 9 is regulated by a clock generator 11. The clock generator 11 can also trigger the pulse generator 2.

If a laser diode is used as the laser 3, a fixed, precise time relationship is obtained between the electrical output pulse of the pulse generator 2 and the optical laser pulse. The pulse transit time, and thereby the distance to the target, can thus be directly determined from the time position of the electrical pulse of the pulse generator 2 and the time position of the received echo pulse.

To achieve greater range finder coverage, it is necessary to use laser sources with greater capacity. So-called pumped lasers, especially diode-pumped lasers are suitable for this purpose. Since the optical pulse is activated spontaneously with these laser types, a precise time relationship does not exist here between the electrical pulses of the pulse generator 2 and the optical pulses emitted by the laser. In such cases, triggering of the pulse generator 2 by the clock generator 11 is superfluous.

Irrespective of the laser source used, a small proportion of the laser pulse, which has been decoupled from the transmission beam by an optical element 4, for example a beam-splitter cube, may be sent to the photodiode 7 via an optical guide, for example via a fibre-optic cable 12, to determine the precise time of emission of the optical pulse. The fibre-glass cable 12 is of a defined length, and may, if necessary, be supplemented by an optical attenuation device 13. The start pulse obtained in this manner initiates measurement of the time position of the echo pulse and start pulse, from which the range is ultimately determined.

According to the invention, definition of the time slot of the pulses is significantly improved in terms of accuracy and resolution in that sampling values selected from the digitised electrical signal are taken and fitted into previously obtained signature surfaces comprising device properties that are relevant to the measurement of transit time.

In detecting these properties of the devices, optical pulses of varying amplitudes and constant pulse transit time are sent to the receiving channel. The optical pulses are converted into electrical signals in the photodiode 7 and amplified in the amplifier 8. The signal-to-noise ratio may here be improved by time averaging. By means of a defined, successive time shift of the laser pulses relative to the sampling clock, an effective sampling of the received signals can also be achieved with a multiple of the clock frequency. Following the signal detection, in particular after a discrimination with respect to noise, a signature surface is determined from the multiplicity of electrical pulses arising, or the corresponding sampling values, into which signature surface sampling values of the pulses selected during the measurement are then fitted, as a result of which the time slot of the pulses is determined with a high degree of accuracy.

In the event that lasers are used for which there is no fixed, precise time relationship between the electrical output pulse of the pulse generator 2 and the optical laser pulse, for example diode-pumped lasers, the determination of the time position of the echo pulses may take place by, for example, threshold detection. Oversampling is achieved in that a plurality of pulses of identical amplitude with a time slot that is random relative to the sampling grid are detected. Averaging as described above cannot take place in this case, but operations can take place using for example a high oversampling rate statistically distributed over time, and appropriate smoothing can be undertaken subsequently, for example in the course of calculation of the signature surface.

Connected in series downstream of the range finder 1 is an evaluation device 21, which receives the data stream output via the interface 10 and essentially comprises an arithmetical unit (signal processor). The blocks shown in the drawing may be realised with both hardware components and with software. The evaluation device 21 is equipped with a first mode for receiving the signature surface and a second mode for the actual measurement. The respective mode is set using the changeover switch 22.

At stage 24, a signature surface is determined from the multiplicity of pulses obtained during the reception process, the details of this signature surface being explained in greater detail with reference to FIGS. 3, 4 and 8. In general, a plurality of signature surfaces are determined at various operating temperatures (for example $T_1$ and $T_2$) of the device and stored in sub-memories 25 and 26. For the actual measurement of the pulse reception time, the current operating temperature is first measured and a signature surface optimally matched to the current operating temperature is calculated by interpolation and/or extrapolation (block 27) from the signature surfaces stored in memories 25 and 26, this signature surface being provided in a memory 28 for use in the measurement.

To carry out the range measurement, the switch 22 is switched to measurement. In a first stage, a selection of for example three or five sampling values is made at stage 29, according to the criteria stored therein, from the multiplicity of sampling values supplied by the analogue/digital converter 9 for each emitted laser pulse, the mean value of these sampling values exhibiting for example the greatest amplitude in each case. At stage 30, the signature surface present in the memory 28 is matched to these selected sampling values.

In this manner, both the time position of the echo pulse and that of the start pulse may be determined. By counting the clock pulses of the clock generator 11 between the time position of the start pulse and echo pulse at stage 31, the pulse transit time is initially roughly determined whilst, in parallel, the respective time position of the signature surface relative to the timing pattern is determined for both the start pulse and the echo pulse at stage 32. The pulse transit time is calculated from these values with a high degree of accuracy at stage 33. At stage 34, the distance between the range finder and the target is determined from the pulse transit time obtained in this manner.

At stage 32, the amplitude of the echo pulse can also be derived from the signature surface. In conjunction with the pulse transit time, conclusions can be drawn from this value as to the reflectivity of the target and thereby as to particular features thereof.

Figure 2:
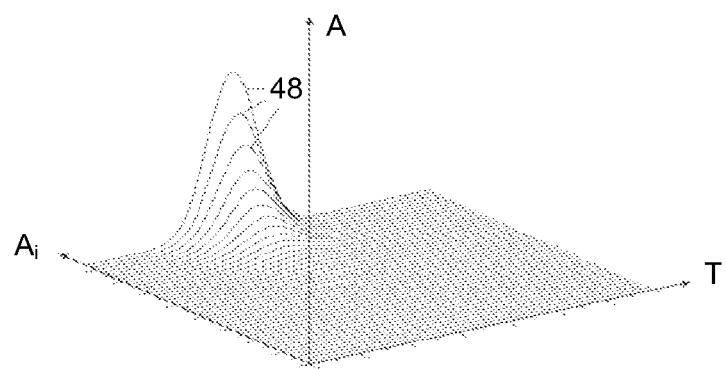
FIG. 2 shows a group of reference pulses of differing amplitudes.

FIG. 2 shows a group of optical pulses (reference pulses) 48. The optical signal strength (amplitude) A shown corresponds to the overall control range of the combination of the photodiode 7, amplifier 8 and analogue/digital converter 9.

Figure 3:
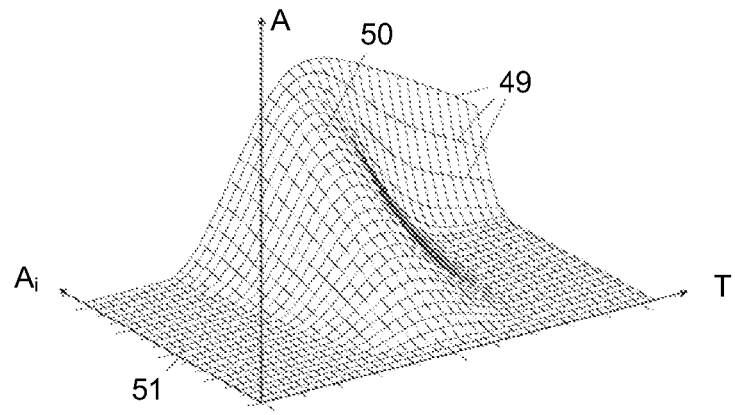
FIG. 3 shows a group of reference signals as they are obtained in the form of received signals at the output of a nonlinear receiving channel in response to the reference pulses from FIG. 2 and span a signature surface.

FIG. 3 shows the electrical pulses ("received signals") 49 obtained for the optical pulses 48 at the output of the amplifier 8. By conversion of the optical pulses 48 in the photodiode 7 and by the nonlinear amplification in the amplifier 8, the dynamic range of the electrical pulses 49 relative to that of the optical pulses 48 is significantly reduced. Owing to the nonlinear amplification and saturation effects, considerable changes to the pulse form also occur.

The individual pulses, or the sampling values thereof, are in a fixed phase relationship relative to the sampling and amplitude grid 51, the time scale T of which is defined by the clock generator 11. The sampling values are, in general, initially distributed irregularly in the direction of the amplitude index $A_i$. Through a matching process, a signature surface 50 is now calculated from the multiplicity of sampling values, the nodes of which signature surface are distributed uniformly according to the grid 51. The signature surface 50 contains information, in a compact form, regarding the pulse forms of the electrical echo signal over the entire useful dynamic range of the receiving channel.

The values of the signature surface 50 between the node points are determined by interpolation. Modelling of the signature surface may take place using a triangulation network, and the said matching may here be attributed to a linear equational system. This signature surface can be used, as now explained with reference to FIG. 4, to determine the time position (reception time) of a received optical pulse (echo pulse or start pulse) and its signal strength (amplitude) with a high degree of accuracy and low calculation requirement.

Figure 4:
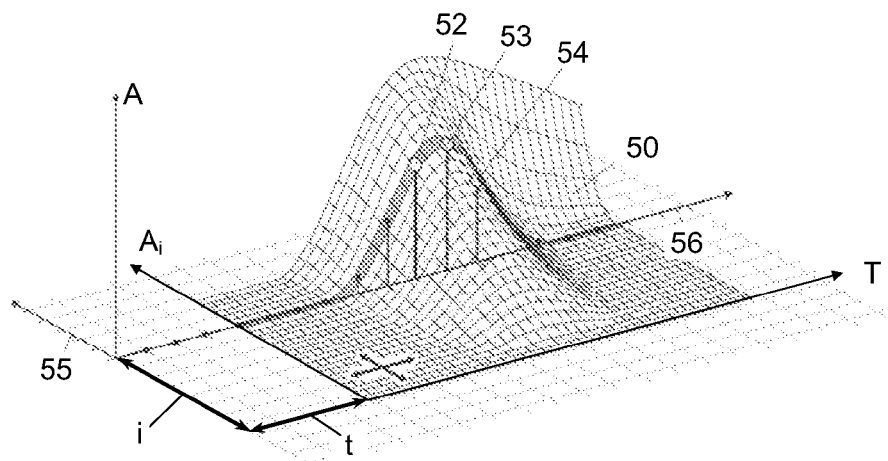
FIG. 4 shows the fitting of the sampling values of a received signal into a reference signal group (signature surface) with varying time and amplitude index offset.

FIG. 4 shows how sampling values of a pulse selected for the measurement of the reception time of said pulse are "fitted" into the signature surface 50. According to the above-described methods, three sampling values 52, 53 and 54, for example, were selected from the sampling values of an electrical pulse. By shifting of the signature surface 50 in both axial directions (T, $A_i$), it is matched to the sampling values 52, 53, 54 in a manner such that the deviations between the sampling values 52, 53, 54 and the signature surface 50 assume a minimum (minimum of the sum of the squares of the deviations). At this minimum, the exact time position t of the echo pulse is derived as a shift in the direction of the time scale T (sampling grid 56) from the relative position of the signature surface 50 with respect to the reference lines 55 and 56. From the shift i of the signature surface 51 in the direction of the amplitude index axis 55, the amplitude A of the optical echo pulse can be determined.

In order to determine initial approximation values for the fitting, additional auxiliary surfaces derived from the signature surface 50 may be utilised.

The described fitting takes place both for the start pulse and for each individual echo pulse detected relative to an emitted transmission pulse. Determination of the target distance may now take place in two different ways. On the one hand, the distance to the target is derived from the transit time difference between the start pulse 36 associated with the current laser pulse and the respective echo pulse. By deriving the difference between the determined transit times of the echo pulse and start pulse in each case, any fluctuations in the time slot of the laser pulse relative to the trigger pulse are eliminated. However, uncertainties in the fitting, brought about by amplitude noise in the sampling values, add up quadratically, which, assuming identical circumstances for the start pulse and echo pulse, leads to an increase in the noise of the range finding by a factor of 1.4. On the other hand, if the time slot of the laser pulse relative to the trigger pulse from the clock generator that initiates the laser pulse is sufficiently constant, the position of the start pulse can be determined with a high degree of accuracy by averaging. In this case, measurement with reduced noise can be achieved by relating the time slot of the echo pulse to the averaged position of the start pulse.

Figure 5:
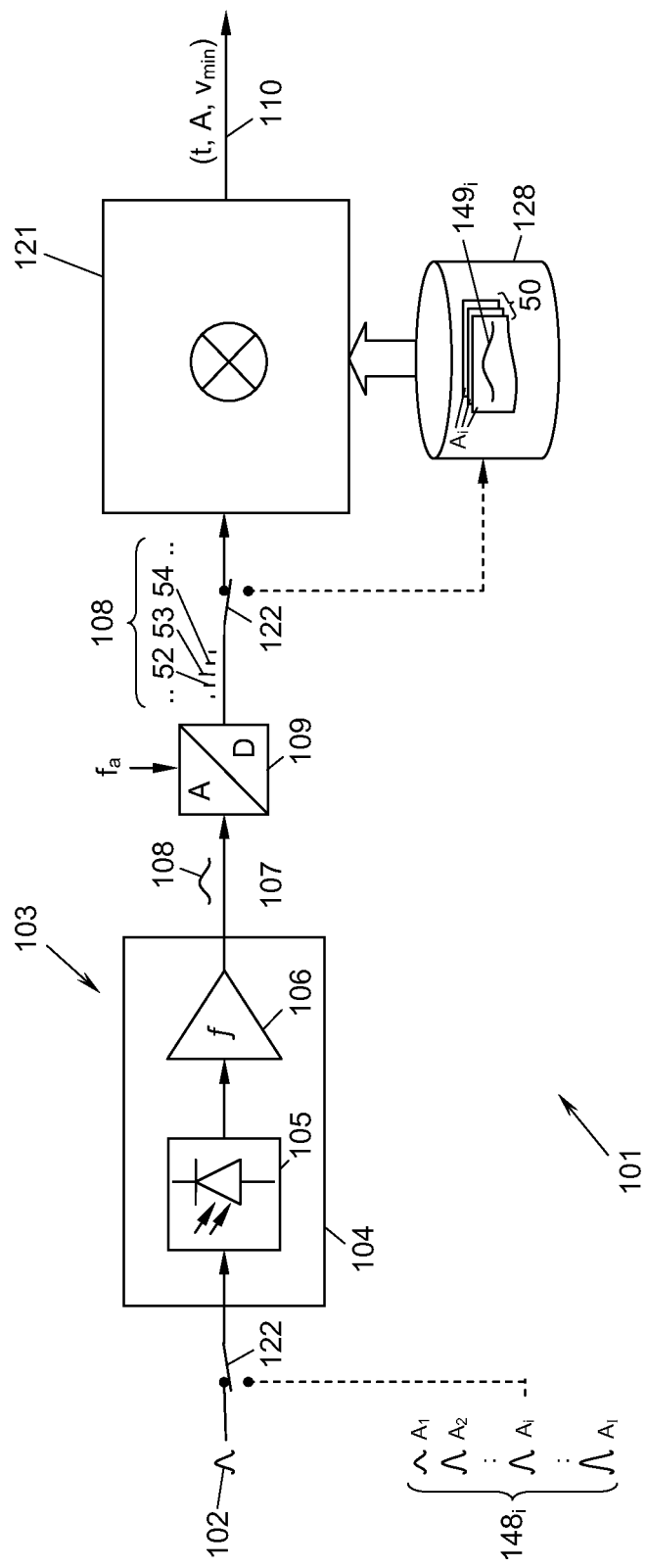
FIG. 5 shows a block diagram of a second embodiment of the apparatus according to the invention with one receiving channel.

FIG. 5 shows a generalised embodiment of a device 101 for measurement of the reception time t of a pulse 102, which is received in a receiving system 103 with a single receiving channel 104. In the example shown, the receiving system 103 is an opto-electronic receiving system, the pulse 102 is, accordingly, an optical pulse, for example a laser pulse, and the receiving channel 104 includes a photodiode 105.

It is obvious that the receiving system 103 may also be of any type other than the opto-electronic type shown, for example a radio receiving system for radio or radar pulses, an acoustic receiving system for acoustic pulses or echoes, a receiving circuit in an electronic system for processing electronic pulses, etc.

The receiving channel 104 is preferably assembled from analogue components in order to achieve the highest possible bandwidth, as is known to the person skilled in the art. For the processing of pulses 102 with a high dynamic range, the receiving channel 104 preferably further exhibits a transmission response which compresses the dynamic range and is here symbolised by an amplifier 106, which compresses the amplitude dynamic range of the pulse 102. As a result, a received signal 108 occurs at the output 107 of the receiving channel 104, which received signal comprises a dynamically-compressed version of the input pulse 102 which is therefore distorted in its amplitude form. Generally speaking, the receiving system 104 may exhibit any nonlinear transmission response.

The received signal 108 is sampled and digitised in an analogue/digital converter 109 with a sampling rate $f_a$ of for example 500 Msamples/s, for example with a bit width of 8, 12 or 16 bits. The digitised received signal 108 consists of the above-mentioned individual sampling values 52, 53, 54 etc.; for the sake of simplicity, its sampling values are designated below in their entirety as the received signal 108.

The received signal 108 is supplied to an evaluation device 121. The evaluation device 121 compares the received signal 108 with reference signals $149_i$ stored in a memory 128 in order to ultimately determine therefrom the reception time t and the amplitude A of the pulse 102 and to output them, together with a quality indicator $v_{min}$ as to the reliability of the measured values t, A, at an output 110. In this comparison, the evaluation device 121 carries out, as already briefly mentioned above with reference to FIG. 4, the fitting of the received signal 108 into a signature surface 50 spanned by the reference signals $149_i$, as will be explained in greater detail below.

First, the generation of the reference signals $149_i$ will be described in greater detail. The reference signals $149_i$ are the result of a training and calibration sweep of reference pulses $148_i$ of predetermined varying amplitudes, for example the optical pulses 48 from FIG. 2, by the device 101.

For the training sweep, the device 101 is switched via the symbolically shown switch 122 into the training mode shown with broken lines. In this mode, the received signals 108 of I different reference pulses $148_i$ (i=1 . . . I), each with identical pulse form but varying amplitudes $A_i$, are each stored in the form of a reference signal $149_i$ for a specific amplitude $A_i$ in the memory 128, with respect to a common time scale T. This is simple to achieve because the reception time of the received signal 108 of a reference pulse $148_i$ is known in the training mode.

Figure 6:
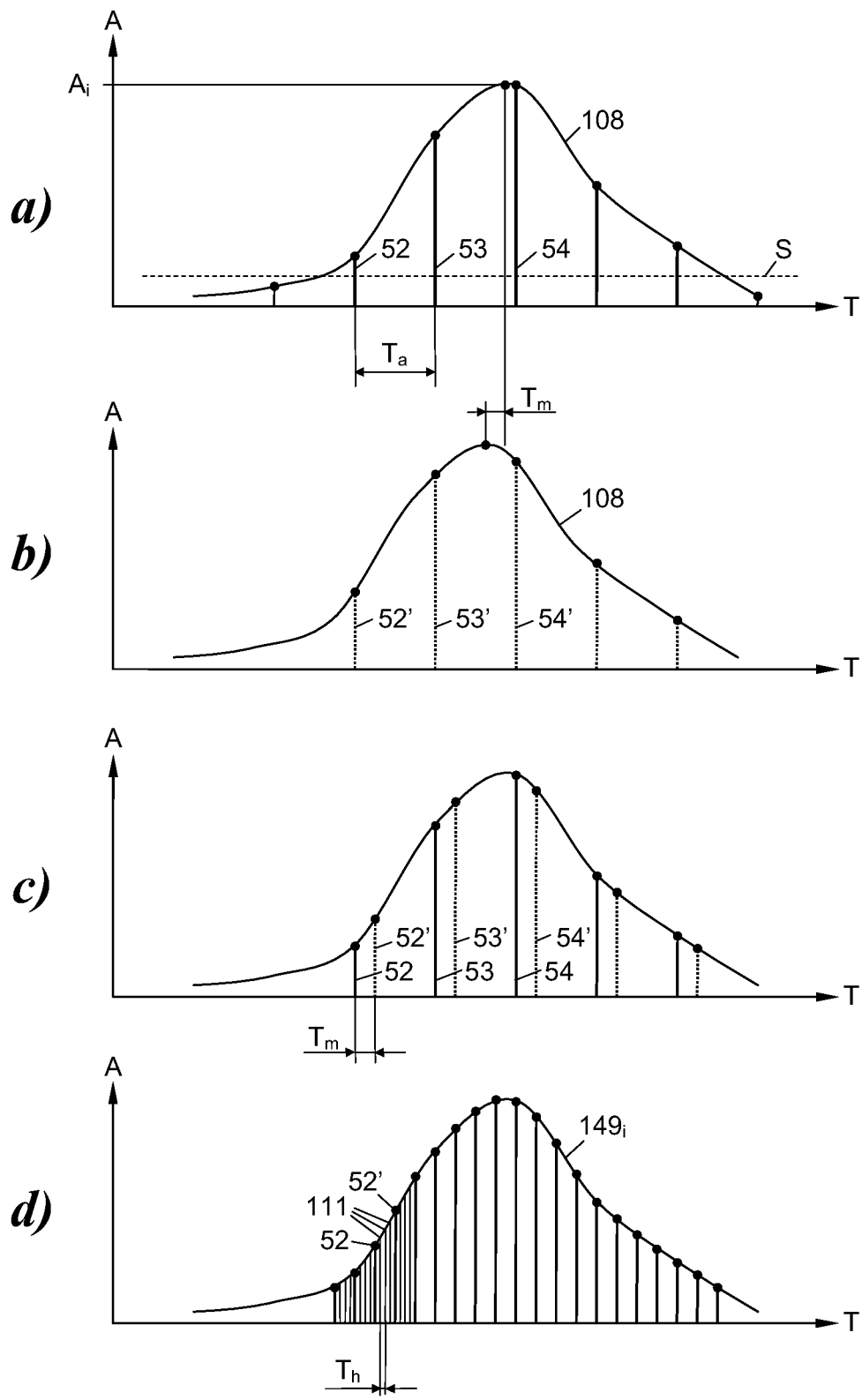
FIG. 6 shows the method for generating a high-resolution reference signal in four successive method stages.

It should be especially stressed that the process of fitting the sampling values 52, 53, 54 into the signature surface 50, i.e. the comparison of the received signal 108 of a pulse 102 with the reference signals $149_i$, can be carried out with a higher time resolution than the sampling rate $f_a$ by storing the reference signals $149_i$ in the memory 128 in a higher time resolution of the time scale T and by carrying out the fitting process in the resolution steps of this higher time resolution. High-resolution reference signals $149_i$ of this kind can, nevertheless, be obtained with the same device 101, as briefly explained with reference to FIG. 6.

FIG. 6a shows the received signal 108 of a reference pulse 148, with predetermined amplitude $A_i$. The received signal 108 is sampled with a relatively "low" sampling rate $f_a$ of for example 500 Msamples/s in order to obtain the sampling values 52, 53, 54, etc. This sampling rate corresponds to a time resolution $T_a=1/f_a$ of 2 ns, which in the case of, for example, optical light pulses, corresponds to a range resolution of 60 cm.

Preferably, only such sampling values 52, 53, 54, etc. as exceed an amplitude threshold S are included for the generation of the reference signals $149_i$.

FIG. 6b shows the received signal 108 of an identical reference pulse $148_i$ which is of the same amplitude $A_i$ but was received shifted in phase by a predetermined slight time offset $T_m$. The time offset $T_m$ may be achieved by, for example, time-offset emission of the pulses in the transmitting system, for example by time offsetting the trigger pulses of the pulse generator 2 in the case of the device in FIG. 1, or by alteration of the transmission path of the reference pulses, for example by adjustment of the distance of the reflective target in the case of optically reflected pulses.

Sampling of the received signal 108, time-offset by $T_m$, with the same sampling rate $f_a$ therefore generates further sampling values 52', 53', 54', etc. at times offset by $T_m$ (FIG. 6c). By continuous further time offsetting of the reference pulse $148_i$ by $T_m$ until ultimately the entire time range $T_a$ to $T_m$ is covered, all sampling values 52, 52', etc. obtained can then be combined "in a meshed manner", i.e. alternately in succession, to form a reference signal $149_i$ which is sampled with the high time resolution $T_m$, see FIG. 6d. In the example shown, $T_m=T_a/4=500$ ps.

FIG. 6d shows the optional further stage of the incorporation of interpolation values 111 between the sampling values 52, 52', etc. of the reference signal $149_i$ in order to achieve an especially high time resolution $T_h$ which in principle may be as fine as required and is restricted only by memory and computing capacity. For example, in each case 249 interpolation values 111 are inserted between two sampling values 52, 52', etc. so that the time resolution is $T_h=T_m/250=2$ ps, corresponding to a sampling rate $f_h$ of 500 Gsamples/s.

It is apparent from this that, during the process of fitting a received signal 108 with low-time-resolution sampling values 52, 53, etc. into a signature surface 50 spanned by reference signals $149_i$, an extremely sensitive comparison can nevertheless be carried out in the direction of the time scale T in resolution steps $T_m$ or $T_h$ of the high-resolution reference signals $149_i$, with a time resolution of up to 2 ps in the example shown. This corresponds, for example in the case of light pulses, to a range resolution of 0.6 mm or, in the case of a reflective laser range finder or scanner, to an accuracy of 0.6 mm/2=0.3 mm.

As previously mentioned above, further reference signals $149_i$ obtained by interpolation may also be incorporated between the individual, actually obtained reference signals $149_i$ of a reference signal group or signature surface 50, so that the resolution of a signature surface 50 can be significantly increased yet further also in the direction of its amplitude index $A_i$—over and above the quantity I of the reference pulses $148_i$ originally used. The reliability of the fitting of a received signal 108 into the signature surface 50, and thereby the accuracy of the measurement, can be increased yet further as a result.

A further significant increase in the reliability and thereby accuracy of determination of the reception time is achieved using the multi-channel devices and methods described below.

Figure 7:
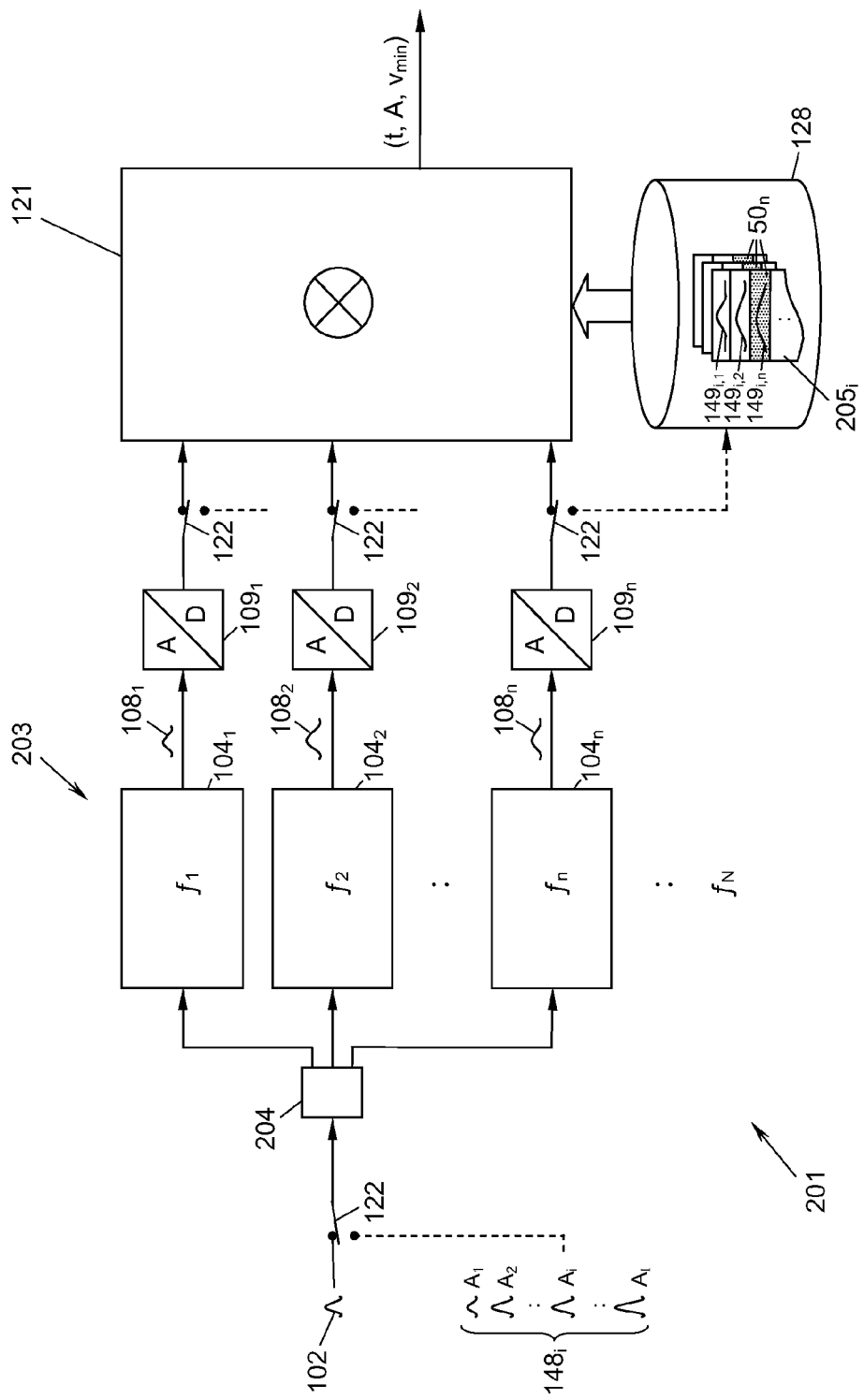
FIG. 7 shows a block diagram of a third embodiment of the apparatus according to the invention with a plurality of receiving channels.

FIG. 7 shows a further embodiment 201 of a device of this kind according to the invention with a multi-channel receiving system 203 for processing pulses 102 of high dynamic range.

The receiving system 203 contains N receiving channels $104_n$ (n=1 . . . N) connected in parallel to which a pulse 102 is supplied simultaneously via a signal splitter 204. The received signals $108_n$ obtained at the output of the receiving channels $104_n$ are supplied to the evaluation device 121 via analogue/digital converters $109_n$.

The receiving channels $104_n$ each exhibit a different sensitivity and/or a different nonlinear transmission response, so that the received signals $108_n$ also each exhibit different forms. The set of received signals $108_n$ obtained for a pulse 102 via the receiving system 203 is therefore characteristic of this pulse.

Accordingly, in the training mode (broken-line position of the symbolic switch 122), for each reference pulse $148_i$ with a predetermined amplitude $A_i$, N received signals $108_n$ can be received and stored as a set $205_i$ of N reference signals $149_{i,n}$ in the memory 128. As in FIG. 4, all I reference signals $149_{i,n}$ of a receiving channel $104_n$ each span one of the N signature surfaces $50_n$.

Figure 8:
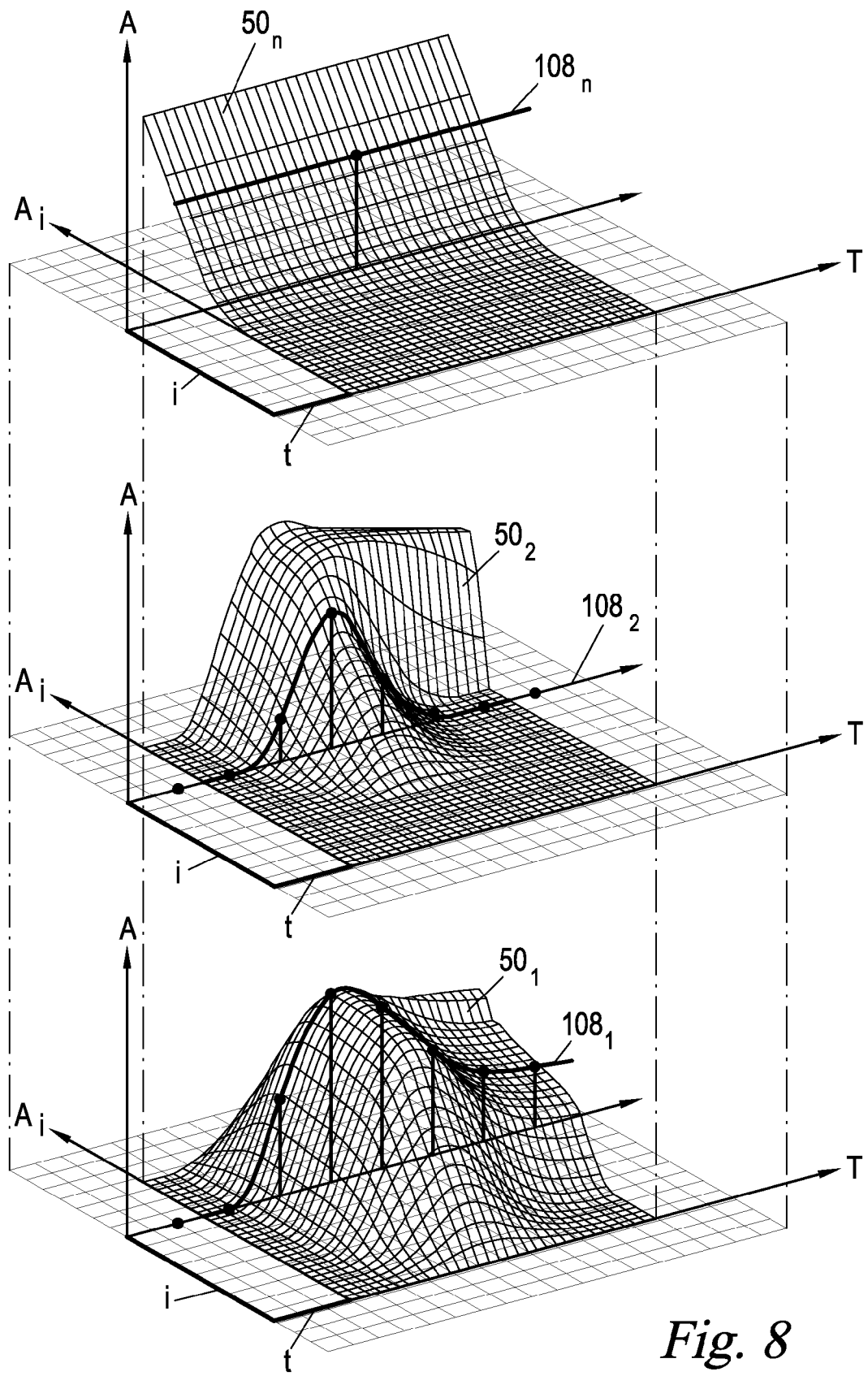
FIG. 8 shows the stage of fitting the sampling values of a multi-channel set of received signals into a multi-channel set of reference signal groups (signature surfaces) with varying time and amplitude index offset.

FIG. 8 shows how a set of received signals $108_n$ of a pulse 102 is simultaneously fitted into all N signature surfaces $50_n$ by common shifting in the amplitude index direction $A_i$ and time scale direction T. In other words, the set of received signals $108_n$ is compared with each of the I reference sets $205_i$, specifically one received signal $108_n$ with one reference signal $149_{i,n}$ and the particular index i and the particular time offset t at which the comparison deviation is a minimum are thus determined.

The sum of the quadratic deviation between a received signal $108_n$ and a reference signal $149_{i,n}$ added up over all N receiving channels is preferably used as the indicator of the comparison deviation in each case:

$$v_{i,t} = \sum_{n,k} (s_{k,n} - r_{k-t,i,n})^2$$

where:
$v_{i,t}$ comparison deviation in respect of time offset t and reference set offset or amplitude index offset i between received signal $108_n$ and reference signal $149_{i,n}$
$s_{k,n}$ sampling value of the received signal $108_n$ at time k
$r_{k-t,i,n}$ sampling value of the reference signal $149_{i,n}$ at time k-t By finding the minimum of $v_{i,t}$, the reception time t and consequently the associated amplitude $A_i$ of the pulse 102 can now be determined.

Figure 9:
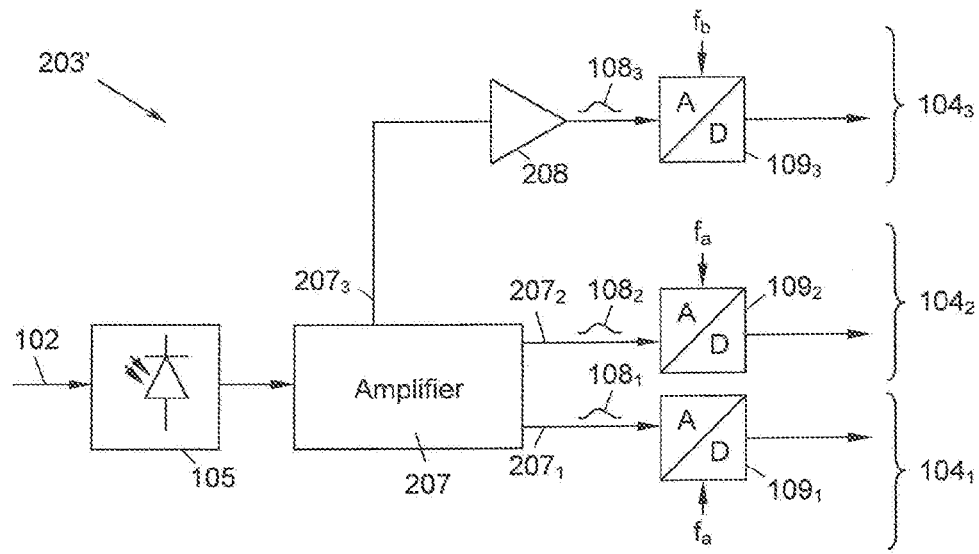
FIG. 9 shows a first variant of a multi-channel receiving system in electrical block diagram form.

FIG. 8 shows, in the channel n shown at the top, a received signal $108_n$ which, for the analysed duration of the pulse 102, here exhibits a largely constant amplitude, as obtained for example either from a strongly integrating receiving channel $104_n$ and/or with a sampling rate $f_b$ which is reduced relative to $f_a$. FIG. 9 shows an example of a receiving system 203', which exhibits two receiving channels $104_1$, $104_2$ of different dynamic compression and one integrating, "slow" receiving channel $104_3$ of this type. A photodiode 105 receives the optical pulse 102. The output of the photodiode 105 is guided to an amplifier 207 with two outputs $207_1$ and $207_2$, which supply received signals $108_1$ and $108_2$ with differing dynamic compression.

At a tap $207_3$ of the amplifier 207, the amplifier provides a signal which indicates one of its current operating states, for example its current charge acceptance or power consumption, its operating temperature, etc., which signal is supplied to a matching amplifier 208. The signal at the tap $207_3$ can thus, on the one hand, be regarded as a "further received signal" $108_3$ since it is also attributable to the pulse 102; on the other hand, however, it is also a signal as to the operating state of the receiving system 203' itself.

In the example shown, the further received signal $108_3$ exhibits a relatively slow time response, so can be digitised cost-effectively with an analogue/digital converter $109_3$ with an especially low sampling rate $f_b$.

Alternatively, further operating states of the receiving systems 103, 203, 203' shown could also be determined as further received signals $108_3$ and, like the other "normal" received signals $108_n$ included in the signature surface matching.

Figure 10:
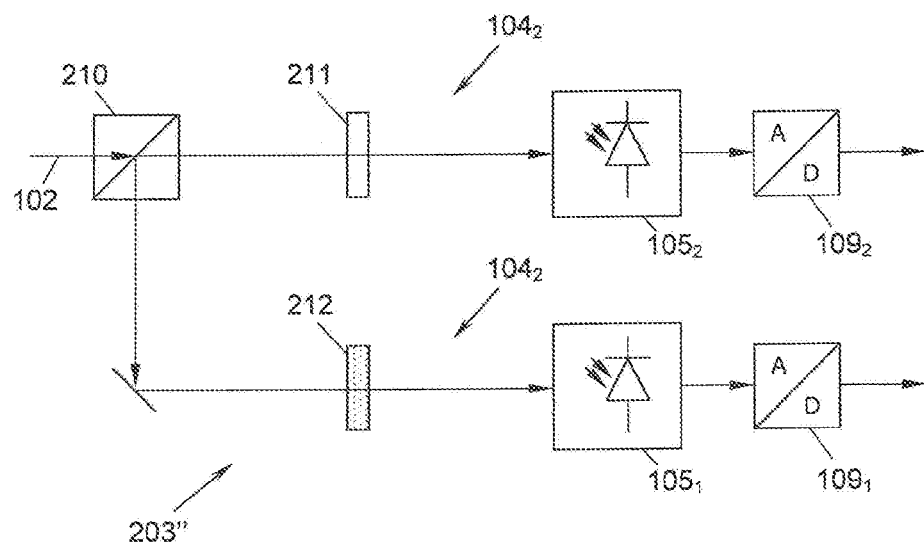
FIG. 10 shows a second variant of a multi-channel receiving system in opto-electrical block diagram form.

In the case of the embodiments of multi-channel receiving systems shown hitherto, the pulse 102 was allocated to the various receiving channels $104_n$ by electrical means. Alternatively, it is also possible in opto-electrical systems such as laser range finders or scanners to allocate the pulse 102 to the receiving channels by optical means, for example using an optical beam-splitter cube 210 in an opto-electrical receiving system 203" as shown in FIG. 10. Differing sensitivity and/or nonlinearity of the receiving channels $104_n$ can here also be achieved by optical components, for example by incorporating optical filters 211, 212 of different attenuation capacity into the beam path.

Figure 11A:
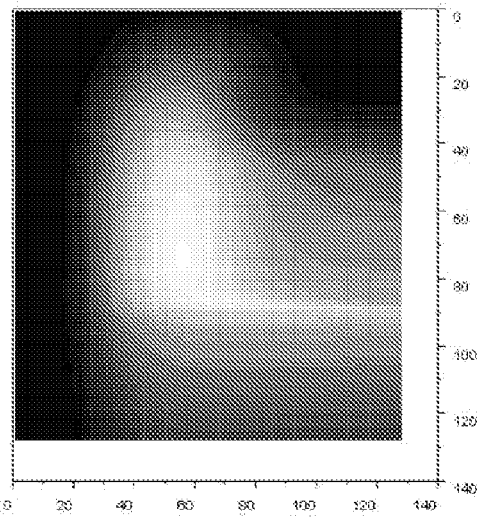
FIG. 11 shows the signature surfaces of the lower and middle channels from FIG. 8 in plan view with grey-scale coding of the amplitude values.
Figure 11B:
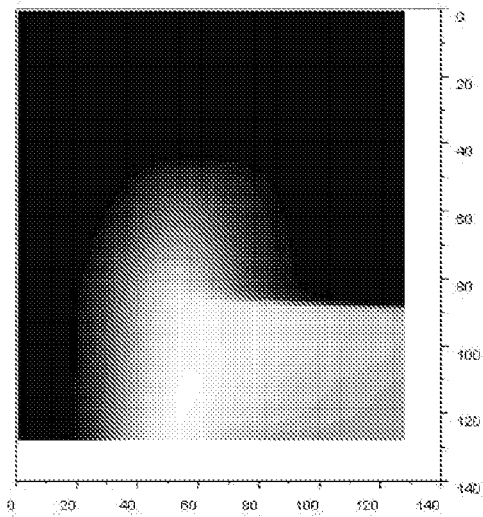

FIGS. 11 and 12 show the use of weighting values in determination of the comparison deviation $v_{i,t}$ in the comparison stages from FIGS. 4 and 8. FIGS. 11a and 11b are plan views of the signature surfaces $50_1$ and $50_2$ of the first and second channel from FIG. 8, the lightness of the grey-scale image indicating the amplitude value of the signature surface.

Figure 12A:
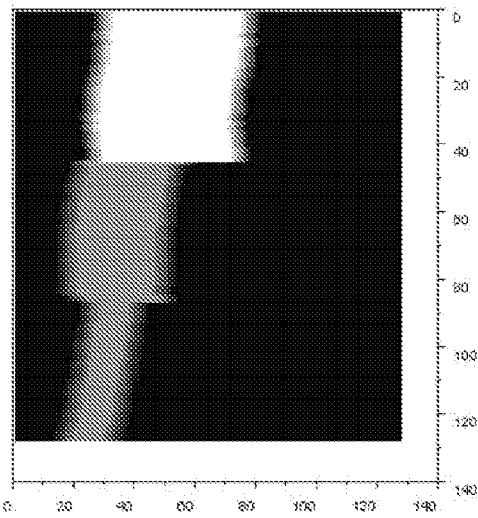
FIG. 12 shows weighting-value surfaces for the signature surfaces from FIG. 11 in plan view with grey-scale coding of the weighting values.
Figure 12B:
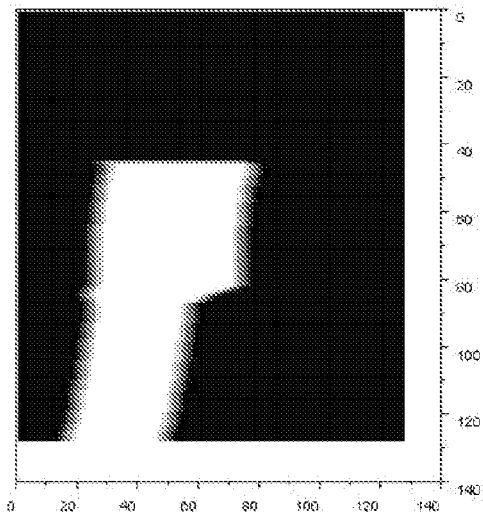

FIGS. 12a and 12b show—in the same type of image—"weighting surfaces" from weighting factors g, which can be allocated to the individual values of the signature surfaces $50_1$, $50_2$ from FIG. 11a and 11b and used for determining a weighted comparison deviation $v'_{i,t}$ in accordance with:

$$v'_{i,t} = \sum_{n,k} g(s_{k,n} - v_{k-t,i,n})^2$$

In FIGS. 12a and 12b, light values indicate higher weighting factors g than dark values; black indicates for example a weighting factor g of zero, white a weighting factor g of 1 and grey a weighting factor g of 0.5. In this manner, specific regions of the signature surfaces $50_n$ can be hidden (g=0), for example to shorten computing time, or a particular significance (g=1) can be attributed thereto.

The invention is not restricted to the embodiments described, but includes all variants and modifications that fall within the scope of the associated claims.

What is claimed is:

1. An apparatus for measurement of a reception time of a pulse in a receiving system including at least one receiving channel with a nonlinear transmission response, which receiving channel supplies a received signal at its output the apparatus comprising:
a memory in which at least two received signals of at least two reference pulses with predetermined different amplitudes are stored as at least two reference signals with respect to a time scale, wherein the reference signals are generated from a training and calibration sweep of the reference pulses, and an evaluation device connected to the receiving system and to the memory, wherein the evaluation device is configured to compare the received signal from the receiving channel with each reference signal of said at least two reference signals using a different time offset each in order to determine that reference signal and that time offset for which the comparison deviation is a minimum, and is configured to output this time offset as the reception time with respect to the time scale.

2. An apparatus for measurement of a reception time of a pulse with high dynamic range in a receiving system including at least two parallel receiving channels of differing sensitivity for one pulse, which receiving channels supply at their outputs a set of time-parallel received signals for said one pulse comprising:

a memory in which at least two sets of received signals of at least two reference pulses with predetermined different amplitudes are stored as at least two reference sets with respect to a time scale, wherein the reference signals are generated from a training and calibration sweep of the reference pulses, and an evaluation device, which is connected to the receiving system and to the memory, is configured to compare the set of time-parallel received signals with each reference set of said at least two reference sets using a different time offset in order to determine that reference set and that time offset for which the comparison deviation is a minimum, and is configured to output this time offset as the reception time with respect to the time scale.

3. The apparatus according to claim 1, wherein at least one of the receiving channels is analogue in nature and the memory and the evaluation device are digital, an analogue/digital converter being present at the output of the receiving channels.

4. The apparatus according to claim 3, wherein the reference signals are present in the memory in a high first time resolution, that the received signal from the receiving channel of the pulse is sampled with a low second time resolution, and that the evaluation device varies the time offset in the resolution steps of the high first time resolution.

5. The apparatus according to claim 4, wherein the first time resolution is in the order of picoseconds and the second time resolution is in the order of nanoseconds.

6. The apparatus according to claim 1, wherein the time scale is universal time.

7. The apparatus according to claim 1, wherein the time scale is referenced to an emission time of the pulse from a transmitting system in order to obtain a transit time from the time offset.

8. The apparatus according to claim 1, wherein the memory additionally contains, for each reference signal, the amplitude of the associated reference pulse, and the evaluation device outputs the amplitude of that reference pulse which is associated with the determined reference signal as the amplitude of the pulse.

9. The apparatus according to claim 1, wherein for the measured reception time, the evaluation device also outputs the associated comparison deviation as an indication of a quality of the measurement.

10. The apparatus according to claim 1, wherein the apparatus comprises at least one sensor which measures and supplies at its output, as a form of further received signal, an operating state of one or more receiving channels, that the memory contains such further received signals of the reference pulses as further reference signals, and that, during the comparison, the evaluation device also compares a further received signal of this kind with the further reference signals and includes it in determining the comparison deviation.

11. The apparatus according to claim 1, further comprising at least one sensor which measures an operating temperature of one or more receiving channels, that the memory contains reference signals for various operating temperatures and that the evaluation device determines therefrom, if necessary by means of interpolation or extrapolation, and uses in the said comparison, the reference signals valid for the respective current operating temperature.

12. The apparatus according to claim 1, wherein the determination of the minimum comparison deviation is carried out using a least squares method.

13. The apparatus according to claim 12, wherein the memory also contains weighting values for the reference signals, which weighting values are incorporated into the least squares method.

14. At least one of a laser range finder and a laser scanner with the apparatus according to claim 7, wherein the pulse is a laser pulse.

15. A method for measuring a reception time of a pulse in a receiving system including at least one receiving channel with nonlinear transmission response, which receiving channel supplies a received signal at its output, the method comprising:

providing at least two received signals of at least two reference pulses of predetermined different amplitudes as at least two reference signals relative to a time scale, wherein the reference signals are generated from a training and calibration sweep of the reference pulses, comparing, by an evaluation device, the received signal from the receiving channel with each reference signal of said at least two reference signals using a different time offset each in order to determine that reference signal and that time offset at which the comparison deviation is a minimum, and outputting this time offset as the reception time with respect to the time scale.

16. A method for measuring a reception time of a pulse of high dynamic range in a receiving system comprising at least two parallel receiving channels of differing sensitivity for one pulse, which receiving channels supply at their outputs a set of time-parallel received signals for said one pulse, the method comprising:

providing at least two sets of received signals of reference pulses of predetermined different amplitudes as at least two reference sets relative to a time scale, wherein the reference signals are generated from a training and calibration sweep of the reference pulses, comparing, by an evaluation device, the set of time-parallel received signals with each reference set of said at least two reference sets using a different time offset each in order to determine that reference set and that time offset at which the comparison deviation is a minimum, and outputting this time offset as the reception time with respect to the time scale.

17. The method according to claim 15, wherein:

the reference signals are provided in a high first time resolution, the received signal being sampled with a low second time resolution and during comparison, the time offset is varied in the resolution steps of the high first time resolution.

18. The method according to claim 17, wherein a reference signal to be provided is generated by using a plurality of reference pulses of the same kind, which are time-offset in the resolution steps of a high time resolution, their received signals being sampled with a low time resolution and combined in a meshed manner to form the reference signal.

19. The method according to claim 18, wherein the combined reference signal is brought to an even higher time resolution by insertion of interpolation values.

20. The method according to claim 17, wherein the high first time resolution is in the order of picoseconds and the low second time resolution in the order of nanoseconds.

21. The method according to claim 15, wherein the time scale is universal time.

22. The method according to claim 15, wherein the time scale is referenced to an emission time of the pulse from a transmitting system in order to obtain a transit time from the time offset.

23. The method according to claim 15, further comprising: for each reference signal, the amplitude of the associated reference pulse is provided and that the amplitude of that reference pulse which is associated with the determined reference signal is output as the amplitude of the pulse.

24. The method according to claim 15, wherein for the pulse, at least one further received signal is obtained from an operating state of at least one receiving channel, compared with further reference signals previously obtained in this manner for reference pulses, and included in determination of the comparison deviation.

25. The method according to claim 15, wherein the reference signals are provided for various operating temperatures, and that therefrom, if necessary by means of interpolation or extrapolation, are determined those reference signals which are valid for the particular current operating temperature.

26. The method according to claim 15, wherein the determination of the minimum comparison deviation is carried out using a least squares method.

27. The method according to claim 26, wherein predeterminable weighting values for the reference signals are incorporated into the least squares method.

28. The method according to claim 22, wherein the pulse is a laser pulse in a laser range finder or laser scanner.

29. The apparatus according to claim 2, wherein the receiving channels are analogue in nature and the memory and the evaluation device are digital, an analogue/digital converter being present at the output of the receiving channels.

30. The apparatus according to claim 29, wherein the reference sets are present in the memory in a high first time resolution,
that the received signals from the receiving channels of the pulse are sampled with a low second time resolution, and
that the evaluation device varies the time offset in the resolution steps of the high first time resolution.

31. The apparatus according to claim 30, wherein the first time resolution is in the order of picoseconds and the second time resolution is in the order of nanoseconds.

32. The apparatus according to claim 2, wherein the time scale is universal time.

33. The apparatus according to claim 2, wherein the time scale is referenced to an emission time of the pulse from a transmitting system in order to obtain a transit time from the time offset.

34. The apparatus according to claim 2, wherein the memory additionally contains, for each reference set, the amplitude of the associated reference pulse, and the evaluation device outputs the amplitude of that reference pulse which is associated with the determined reference set as the amplitude of the pulse.

35. The apparatus according to claim 2, wherein for the measured reception time, the evaluation device also outputs the associated comparison deviation as an indication of a quality of the measurement.

36. The apparatus according to claim 2, wherein the apparatus comprises at least one sensor which measures and supplies at its output, as a form of further received signal, an operating state of one or more receiving channels,
that the memory contains such further received signals of the reference pulses as further reference signals and
that, during the comparison, the evaluation device also compares a further received signal of this kind with the further reference signals and includes it in determining the comparison deviation.

37. The apparatus according to claim 2, further comprising at least one sensor which measures an operating temperature of one or more receiving channels,
that the memory contains reference sets for various operating temperatures and
that the evaluation device determines therefrom, if necessary by means of interpolation or extrapolation, and uses in the said comparison, the reference sets valid for the respective current operating temperature.

38. The apparatus according to claim 2, wherein the determination of the minimum comparison deviation is carried out using a least squares method.

39. The apparatus according to claim 38, wherein the memory also contains weighting values for the reference sets, which weighting values are incorporated into the least squares method.

40. At least one of a laser range finder and a laser scanner with the apparatus according to claim 33, wherein the pulse is a laser pulse.

41. The method according to claim 16, wherein:
the reference signals are provided in a high first time resolution,
that the received signal is sampled with a low second time resolution and
that, during comparison, the time offset is varied in the resolution steps of the high first time resolution.

42. The method according to claim 41, wherein a reference set to be provided is generated by using a plurality of reference pulses of the same kind, which are time-offset in the resolution steps of a high time resolution, their received signals being sampled with a low time resolution and combined in a meshed manner to form the reference set.

43. The method according to claim 42, wherein the combined reference set is brought to an even higher time resolution by insertion of interpolation values.

44. The method according to claim 41, wherein the high first time resolution is in the order of picoseconds and the low second time resolution in the order of nanoseconds.

45. The method according to claim 16, wherein the time scale is universal time.

46. The method according to claim 16, wherein the time scale is referenced to an emission time of the pulse from a transmitting system in order to obtain a transit time from the time offset.

47. The method according to claim 16, further comprising: for each reference set, the amplitude of the associated reference pulse is provided and that the amplitude of that reference pulse which is associated with the determined reference set is output as the amplitude of the pulse.

48. The method according to claim 16, wherein for the pulse, at least one further received signal is obtained from an operating state of at least one receiving channel, compared with further reference signals previously obtained in this manner for reference pulses, and included in determination of the comparison deviation.

49. The method according to claim 16, wherein the reference sets are provided for various operating temperatures, and that therefrom, if necessary by means of interpolation or extrapolation, are determined those reference sets which are valid for the particular current operating temperature.

50. The method according to claim 16, wherein the determination of the minimum comparison deviation is carried out using a least squares method.

51. The method according to claim 38, wherein predeterminable weighting values for the reference sets are incorporated into the least squares method.

52. The method according to claim 46, wherein the pulse is a laser pulse in a laser range finder or laser scanner.

\* \* \* \* \*